Jan. 14, 1964  L. I. PICKERT  3,117,823
FLUID PRESSURE BRAKE SYSTEM
Filed March 29, 1962
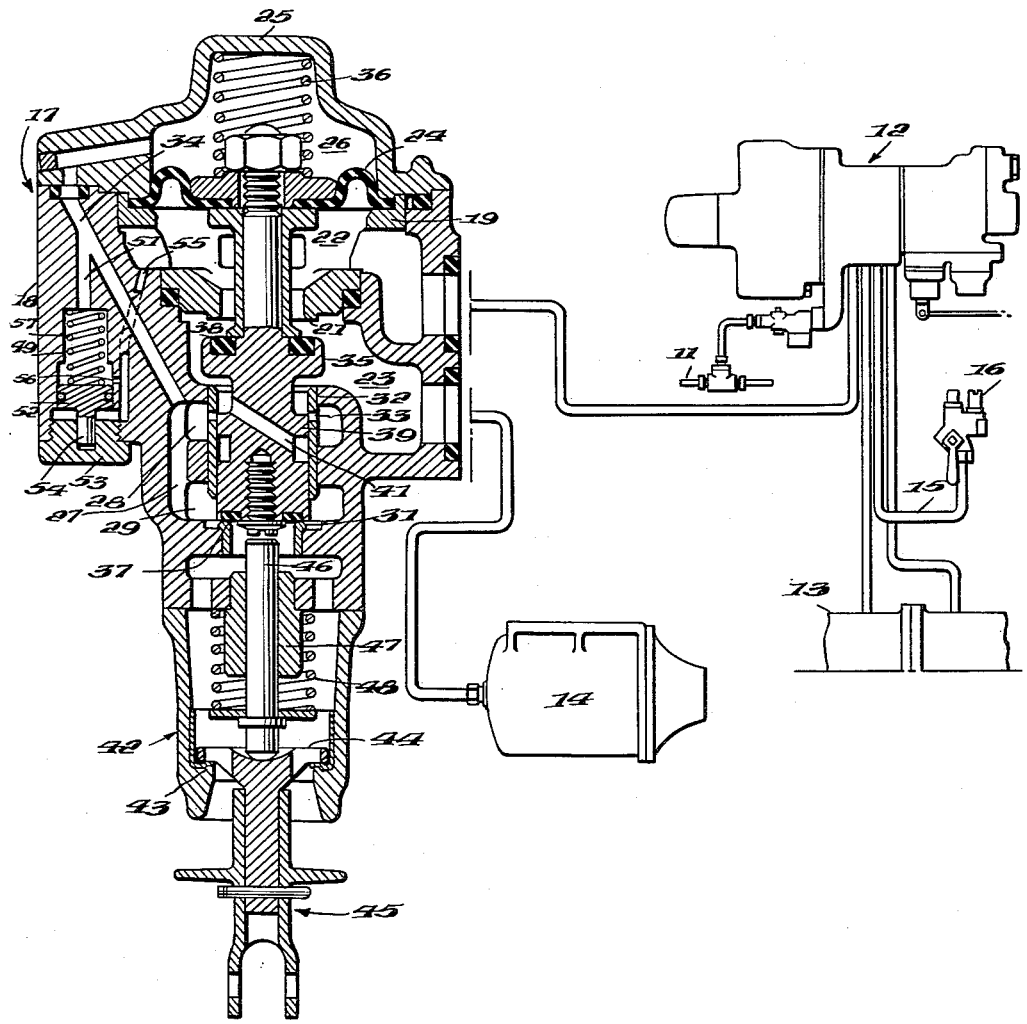
INVENTOR.
LYNN I. PICKERT,
BY Dodge and Son
ATTORNEYS

United States Patent Office 3,117,823
Patented Jan. 14, 1964

3,117,823
FLUID PRESSURE BRAKE SYSTEM
Lynn I. Pickert, Watertown, N.Y., assignor to The New York Air Brake Company, a corporation of New Jersey
Filed Mar. 29, 1962, Ser. No. 183,560
4 Claims. (Cl. 303—69)

This invention relates to an improved brake cylinder release valve for fluid pressure brakes. Particularly it relates to a self-contained valve for interposition between the control pipe and the brake cylinder of a conventional fluid pressure brake system, and which will automatically reset, after manual actuation, to re-establish normal brake system functions.

A shortcoming of such brake cylinder release valves in the past has been the fact that if the release valve is used to release pressure from a brake cylinder in a system which includes a retainer valve set in retain position, the release valve will not reset and the brake cylinder may remain out of service for an extended period. One way of overcoming this shortcoming is disclosed in the Klein Patent No. 2,444,993 dated July 13, 1948, and owned by the assignee of the present application. This solution requires auxiliary piping and for that reason is not considered the best possible solution to the problem. It has been proposed to include a reset-insuring valve which provides communication from the control pipe chamber to the brake cylinder chamber, which valve is normally open, and which closes only when control pipe pressure exceeds brake cylinder pressure by an amount less than the full equalization pressure existing during a full-service application of the brakes.

Release valves of the type presently preferred include a motor which holds the valve in its release or abnormal position when the valve is manually shifted from its normal position. Desirably this motor is snap-acting and insures shifting of the release valve to abnormal position as well as performing the holding function. The motor includes a movable abutment connected with the valve. One side of the abutment is subject at all times to control pipe pressure. The other side is selectively vented or connected with the brake cylinder according to whether the valve is in release or normal position.

A reset-insuring valve previously proposed permits, when it is open, control pipe chamber pressure to blow down into the brake cylinder chamber which is vented when the valve is used to release a brake cylinder. This valve is open only when the control pipe pressure does not exceed brake cylinder pressure by an amount higher than the maximum pressure retained by the retainer valve.

Experience with reset-insuring valves of this type has not been satisfactory. Desirably, the reset-insuring valve should remain open for as short a time as possible when the release valve is actuated after a full-service application has been made in order to minimize the amount of air released from the control pipe chamber and the associated reservoir or reservoirs. This has led some to urge that the vent passage from the brake cylinder be enlarged so that the brake cylinder chamber can be more rapidly vented whereby the pressure difference required to close the reset-insuring valve is quickly created. Such modification of existing valves is undesirable because it impairs the desired snap-action of the release valve motor.

The present invention concerns a reset-insuring valve which provides direct communication between the control pipe chamber and the vent valve chamber. This reset-insuring valve stays open only when control pipe chamber pressure is below a certain value, greater than retainer valve setting. Response calibration of the reset-insuring valve is not affected by the value of the brake cylinder pressure once the brake cylinder release valve is shifted toward its abnormal or release position. The reset-insuring valve is closed immediately upon shifting of the release valve to release position if control pipe pressure is higher than a selected value which is higher than the maximum retainer valve setting but lower than full-service pressure.

The invention will be described with reference to the accompanying drawing which shows the brake cylinder release valve in axial section and includes, on a smaller scale, a diagrammatic showing of the brake control system of a single car. In the drawing all of the ports and passages are shown as though lying in a common plane. This is for the purpose of simplifying the illustration and in actual practice other spatial arrangements of the ports and passages may be employed.

Typically, and as shown in the drawing, a single freight car has fluid pressure brake controlling equipment including a brake pipe 11, a control valve 12 (the standard AB triple valve is shown), a supply reservoir 13 (the standard dual reservoir including auxiliary and emergency reservoir portions, as required by the AB triple valve, is shown) a brake cylinder 14, a release pipe 15, and a retainer valve 16 controlling the value to which pressure may be reduced in the brake cylinder 14 when control valve 12 is in release position. Retainer valve 16 customarily has a number of settings to which it is manually shiftable. In at least one setting the release pipe is vented completely. In another setting, a pressure of say 20 p.s.i. is retained in the brake cylinder, even though the control valve 12 is in release position.

The present invention is concerned with an improved brake cylinder release valve shown at 17. Such a release valve includes a main housing casting 18, cored as shown to receive valve seat insert 19 which carries on its lower face a valve seat 21. This valve seat lies between a control pipe chamber 22 and a brake cylinder chamber 23. The upper side of the control pipe chamber 22 is closed by slack, flexible diaphragm 24. Diaphragm 24 is clamped in place at its outer periphery by a cap 25 secured to housing 18. A motor chamber 26 is formed in cap 25 above the diaphragm.

A vent valve chamber 27 is formed in lower portion of housing 18 and includes upper and lower annular chambers 28 and 29. A vent valve seat 31 is pressed into housing 18 beneath the vent valve chamber 27. A guide bushing 32 is pressed into the housing as shown and includes radial ports 33. A passage 34 extends from the vent valve chamber 27 to the motor chamber 26.

Flow through the release valve 17 is controlled by a double beat poppet valve 35. Valve 35 includes an axial stem by which it is secured to the diaphragm 24 as shown. The valve 35 and diaphragm 24 are biased toward the illustrated normal position by a light spring 36. A downward presented valve face 37 is formed on the lower end of valve 35, and an upward presented valve face 38 is carried at its upper end. As shown the main valve has reduced diameter portions separated by a land 39. A metering port 41 extends through valve 35 between the reduced diameter portions.

Valve 35 may be shifted by a manual actuator toward abnormal or release position. This actuator includes an extension 42 connected to housing 18 and having at its lower end an inturned flange 43. The ported universally tiltable head 34 of an actuator rod assembly 45 is mounted on flange 43. A push rod 46, guided in bushing 47 pressed into housing 18, is biased by spring 48 into engagement with the head 44.

The portions of the release valve described in the preceding four paragraphs are known in the art and shown in prior patents such as the Klein patent mentioned above.

In accordance with the present invention, a bore 49 is provided. A passage 51 extends upward therefrom and connects with passage 34 which provides communication between motor chamber 26 and vent valve chamber 27. The bore 49 is counterbored as shown and receives therein reset-insuring piston valve 52. A plug 53 closes the open end of bore 49 and includes a central guide recess in which valve stem 54 is received. A passage 55 extends from control pipe chamber 22 to the end of bore 49 beneath valve piston 52. A restricted port 56 extends from passage 55 into bore 49 at a point just above reset-insuring valve piston 52 when the latter is in its lowermost position. A spring 57 biases the reset-insuring piston valve 52 toward its illustrated position.

*Operation*

In the illustrated normal position of the release valve 17, fluid under control of the control valve 12 may flow to and from the brake cylinder 14 without the release valve's having any effect. If when the control valve is in full service (application) or emergency position, it is desired to release pressure from the brake cylinder 14 without following normal release procedures involving the control valve, the actuator rod assembly 45 may be pulled laterally, causing push rod 46 to move up and force valve face 37 away from seat 31. Initial movement of valve 35 will throttle flow through ports 33 and pressure will be quickly dissipated from vent valve chamber 27 and from motor chamber 26. Because flow through ports 33 is throttled, the pressure in brake cylinder chamber 23 and control pipe chamber 22 will be higher than that in motor chamber 26 and diaphragm 24 will be upmoved quickly against the light bias of spring 36, carrying valve 35 full stroke to release position in which valve face 38 closes against valve seat 21. Chambers 22 and 23 are now isolated from one another, and the brake cylinder chamber 23 and brake cylinder 14 will be vented. At the same time the pressure difference quickly created across the piston 52 will be sufficient to move it upwardly against the biasing spring 57 and close off the restricted port 56, thus severing all communication between chambers 22 and 29.

The pressure in control pipe chamber 22 will maintain valve 35 in release position, until this pressure is virtually dissipated. This pressure may be dissipated in either of two ways. If the pressure in chamber 22 is below a selected value, higher than the maximum setting of the retainer valve, the spring 57 will hold reset-insuring valve piston 52 in its lowermost position uncovering restricted port 56. Pressure in chamber 22 will thus be permitted to blow down through passage 55, port 56, bore 49, passages 51 and 34, and vent valve chamber 27. This venting flow will continue until the light bias of spring 36 causes the valve to resume its normal position. This venting flow occurs whether or not the control valve is in release position and regardless of the position in which the retainer valve is set, thus insuring that the release valve will reset. Normally, the release valve is reset by movement of the control valve 12 to release position in which the control pipe chamber 22 will be vented through the control valve and the open retainer pipe 15.

The reset-insuring valve of the present invention is subject in the normal position of the release valve to the equal pressures existing in the brake cylinder chamber 23 and the control pipe chamber 22. When a full service application or emergency application is made and it is desired to operate the brake cylinder release valve, manipulation of the actuating rod will result in immediate venting of motor chamber 26 and bore 49. This venting will cause the reset-insuring valve to be moved upward immediately by pressure trapped in the control pipe chamber and will prevent waste of air from the control pipe and from the reservoirs in communication with that pipe though the control valve. Retention of air in the reservoirs by this means will result in a significant reduction in the time required to recharge the brake system when the car is put back into service, particularly in long freight trains which commonly include one hundred cars or more.

If when the brakes are applied with a predetermined brake cylinder pressure lower than the selected value mentioned above, the release valve is moved to release position, the release valve will be retained in release only for the time required for the control pipe pressure to blow down through the restricted port 56 which will be uncovered. When the pressure in control pipe chamber 22 has been dissipated to a sufficiently low pressure, the spring 36 will return valve 35 to its illustrated normal position.

What is claimed is:

1. In a brake cylinder release valve, adapted for interposition between the control pipe and the brake cylinder of a fluid pressure braking system of the type including a housing defining a control pipe chamber, a brake cylinder chamber and a vent valve chamber, a first valve seat between the control pipe and brake cylinder chambers, a vent valve seat in said vent valve chamber, valve means biased toward a normal position in which it seats only against said vent valve seat and manually shiftable toward release position in which it seats only against said first valve seat, said valve means affording a controlled rate of flow between said brake cylinder chamber and said vent valve chamber during its movement toward and in said release position, and fluid pressure motor means operatively connected with said valve means and including a movable abutment having one face exposed to the control chamber pressure and biasing the motor to shift said valve means to a release position and a second face exposed to the pressure in said vent valve chamber; the improvement which comprises means affording restricted flow between said control pipe chamber and said vent valve chamber; a reset-insuring valve controlling opening and closing of said restricted flow means; fluid pressure motor means exerting a bias on said reset-insuring valve acting in closing direction proportional to the difference between the pressures in said control pipe chamber and said vent valve chamber; and means biasing said reset-insuring valve in an opening direction.

2. In a brake cylinder release valve, adapted for interposition between the control pipe and the brake cylinder of a fluid pressure braking system of the type including a housing defining a control pipe chamber, a brake cylinder chamber and a vent valve chamber, a first valve seat between the control pipe and brake cylinder chambers, a vent valve seat in said vent valve chamber; first valve means biased toward a normal position in which it seats only against said vent valve seat and manually shiftable toward release position in which it seats only against said first valve seat, said valve means including means restricting flow between said brake cylinder chamber and said vent valve chamber, and fluid pressure motor means operatively connected with said valve means and including a movable abutment having one face exposed to the control chamber pressure and biasing the motor to shift said valve means to a release position and a second face exposed to the pressure in said vent valve chamber; a restricted communication from said control chamber to said vent valve chamber, bypassing said first valve seat and said flow restricting means; and pressure-responsive valve means to close said restricted communication in response to a difference in pressure between said control pipe chamber and said vent valve chamber greater than a preselected value.

3. In a brake cylinder release valve of the type having a main valve biased toward a closed position and urged toward a venting position by motor means responsive to the difference between the pressures in a control pipe and in a chamber which may be vented to atmosphere by manual unseating of an exhaust valve, the improvement which comprises pressure actuated reset-insuring valve means biased toward a position in which it establishes restricted communication directly between the control pipe and said chamber and shiftable to a position in which the restricted communication is closed when the pressure in the control pipe exceeds the pressure in said chamber by more than a predetermined amount.

4. In a brake cylinder release valve of the type including a control pipe chamber, a brake cylinder chamber, valve means shiftable between first and second positions in which respectively it interconnects said chambers and isolates said chambers one from the other and vents the brake cylinder chamber, said valve means being biased toward its first position, motor means effective when energized to hold said valve means in second position, said motor means having two working spaces, one of which contains fluid at control pipe chamber pressure and the other of which normally is charged with fluid from the control pipe chamber, and a vent valve operable to vent the other working space and energize the motor means, the improvement which comprises (a) a restricted flow communication between the control pipe chamber and said other working space;
(b) a reset-insuring valve biased to open said communication; and
(c) means responsive to the difference between the pressures in the control pipe chamber and in said other working space urging said reset-insuring valve in a closing direction.

References Cited in the file of this patent
UNITED STATES PATENTS 2,408,129    Sudduth _____ Sept. 24, 1946
3,001,833    Kirk _____ Sept. 26, 1961